July 22, 1969  E. F. TROMBLEY ETAL  3,456,864
DISPOSABLE CUPS AND HANDLES
Filed Nov. 29, 1967
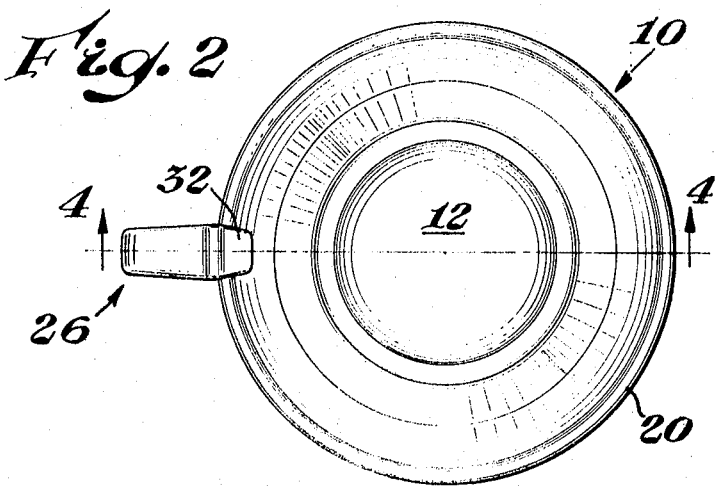
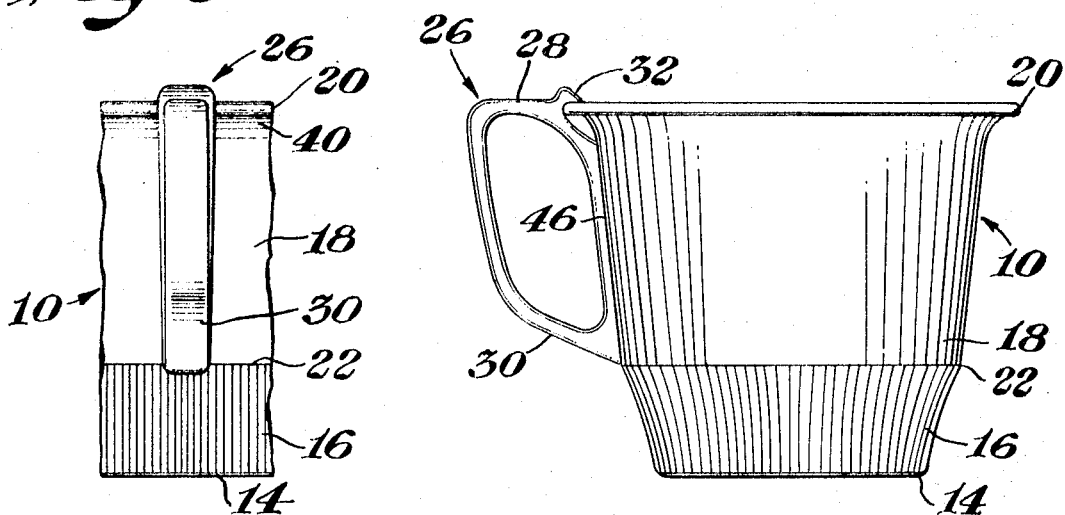
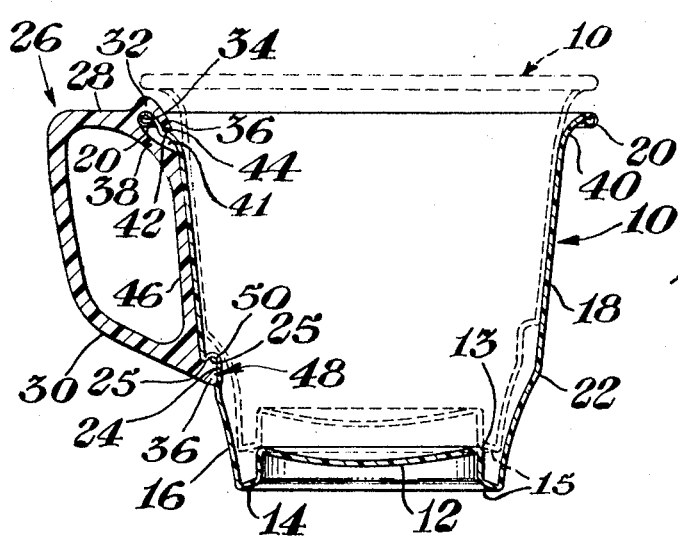
INVENTORS.
Edgar F. Trombley
BY Bertrand N. Trombley
ATTORNEY United States Patent Office 3,456,864
Patented July 22, 1969

3,456,864
DISPOSABLE CUPS AND HANDLES
Edgar F. Trombley, Grosse Pointe Farms, and Bertrand N. Trombley, Bloomfield Hills, Mich., assignors to The Dow Chemical Company, Midland, Mich., a corporation of Delaware
Filed Nov. 29, 1967, Ser. No. 686,655
Int. Cl. B65d 5/46, 1/00, 25/28
U.S. Cl. 229—52                              8 Claims

ABSTRACT OF THE DISCLOSURE

A thermoplastic cup and handle therefor wherein the handle is attached to the cup by the ultimate user. The handle is preferably of rigid plastic and includes a hook engaging the rim of the cup, a downwardly extending leg mating with a tapered side wall of the cup, and a snap-hook at the lower end of the leg engaged with an undercut notch of the cup.

---

Prior to the present invention disposable cups usually made of plastic were customarily designed only to be gripped about their body portion. This often presented problems of heat transfer and made them generally inconvenient to handle unless they were placed in a handled holder of a permanent non-throw away type such as shown in U.S. Patent No. 2,070,414 or U.S. Patent No. Des. 204,474, for example. Paper containers have had pull-out paper handles but, as is commonly known, this gives less than fully satisfactory support for the cups. Other disposable handles for cups, such as shown in U.S. Patent No. 2,070,367, have not been adequately mated with the cup nor of a cooperative design wherein a secure engagement between the two components can be achieved.

Accordingly, it is an object of the present invention to provide a container and handle therefor, both of which are designed to be disposed of after a single use, and which are mated together and adapted to be assembled by the ultimate user, and together provide an especially secure relationship heretofore unknown in disposable handled containers.

Briefly, the present invention provides a throw-away handled container which can be assembled by the ultimate user. The handle has a leg mating with the contour of the side wall of the cup and upper and lower hooks engaged with the cup rim and a cooperating notch of the cup side wall.

Yet additional objects and advantages of the present invention are even more apparent when taken in conjunction with the accompanying drawing in which like characters of reference designate corresponding material and parts throughout the several views thereof, in which:

FIGURE 1 is a side elevational view of a disposable cup with handle employing the principles of the present invention;

FIGURE 2 is a top plan view thereof;

FIGURE 3 is a fragmentary rear elevational view thereof looking at the left end of FIGURE 1; and FIGURE 4 is a cross sectional view thereof taken along the line 4—4 of FIGURE 2 showing by phantom lines another cup nested therewithin.

The cups of the present invention are preferably formed of thermoplastic materials such as polystyrene, polypropylene, polystyrene foam, polyethylene foam, laminates of plastic films and foams, etc., and can be fabricated by such typical methods as injection molding, vacuum or plug assist pressure forming, or by the usual foam sheet forming technique. The handles for these cups are preferably formed from injection molded thermoplastic material such as polystyrene or the like which have sufficient strength and rigidity necessary to support the cup when filled with a liquid. However, it is conceivable that the handles can be made from other materials such as thermosetting plastics, metal or glass. The size of the handle is necessarily dependent on the size of the cup and the combined weight of the cup and its contents when filled.

Referring now more particularly to the drawing, there is shown a plastic container or cup 10 having a recessed bottom wall 12 presenting a peripheral edge 13. Extending about the bottom wall 12 from edge 13 is a generally U-shaped leg 14. Leg 14 has a foot 15 slanted upwardly slightly from its outermost end. Extending upwardly and veering outwardly from leg 14 is a fluted base section 16. Extending upwardly from base section 16 is an outwardly tapered, bottom to top, side wall 18 ending in a rolled or round rim 20. The upper portion 40 of side wall 18, which is joined with rim 20, is much more drastically outwardly veering than the rest of side wall 18. There is a sharp jointure 22 between the bottom section 16 and side wall 18. A notch 24 is located at said jointure 22, is embossed in said side wall 18 and extends upwardly and downwardly therefrom to receive part of a handle, as hereinafter described. The notch 24 is generally reversed C-shaped in configuration, only with the bottom leg of the C cut off before it turns upwardly, the top leg of the C providing an undercut shoulder 25.

A snap-on handle 26 is generally rectangular in configuration having a horizontal portion 28 and a downwardly and then inwardly extending portion 30 which together form the main finger gripping portion of the handle 26. Bending upwardly and then curving downwardly from horizontal portion 28 is an inverted generally U-shaped rim engaging hook 32. Bite portion 34 of hook 32 is of a size adapted to engage over the rim 20. Legs 36 and 38 of hook 32 extend along upper portion 40 of side wall 18 at generally the same angular inclination as the outwardly veering upper portion 40. Preferably, a space 41 is left between leg 38 and upper portion 40 for pivoting clearance. A small nib 42 at the end of leg 36 fits within a slight recess 44 in upper portion 40 to more securely engage the hook 32 with sidewall 18.

Extending downwardly from horizontal portion 28 and leg 38 of hook 32 is a side wall engaging bracing element 46 which is disposed at generally the same angle of taper as is side wall 18 so as to fit closely therealong for substantially the entire height of the sidewall 18 from upper portion 40 to fluted section 16. Thus there is provided mutual support between the handle and the cup body. At the lower end of leg 34 is a locking nub 48 matingly fitting into undercut shoulder 25 of notch 24, there being a slight upwardly directed projection 50 on locking nub 48 of a size to be snap engaged by undercut shoulder 25.

To assemble handle 26 with cup 10 the hook 32 is placed over the rim 20 and the handle is pivoted downwardly until the locking nub 48 snaps into undercut shoulder 25. The resilient character of the thermoplastic material forming the cup 10 permits sufficient flexing of the undercut shoulder 25 to accomplish the snap-in action. Particularly when the cup is filled, pivoting forces about rim 20 continue to cause the locking nub 48 to be pushed into undercut shoulder 25 so that disengagement of the handle and cup during use is highly unlikely. It is thus only necessary to hold the cup by the handle. All of this is obtained in an inexpensive construction adapted for one-time useage.

When a handle 26 is not engaged with a cup 10, such a cup can be nested within a first cup 10 as shown in phantom lines in FIGURE 4. Here the slanted foot 15 of an upper cup 10 rests upon edge 13 of the lower cup 10 so that the two can be stacked together for storage and shipping purposes. A stack of several such cups 10 can be packaged together since there is no need to attach handles 26 until the cups are to be used. Since the handles do not leave much unused space in a box they can be packaged together economically also.

When certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. The combination of a disposable plastic cup and plastic handle wherein the handle can be assembled to the cup by the ultimate user, said cup comprising a bottom wall joined with an upwardly extending side wall tapered outwardly from its bottom to its top and ending in a round rim, an embossment in said side wall forming a notch with an undercut shoulder located intermediate the bottom and top of said side wall, said handle comprising a hook pivotally engaged over said rim, a finger gripping portion extending outwardly from said hook, a locking nub extending from the lower innermost end of said finger gripping portion and snapped into said notch.

2. The combination of claim 1 wherein a projection extends from said locking nub upwardly into the undercut shoulder area of said notch to effect a secure engagement between the handle and cup side wall.

3. The combination of claim 2 wherein a bracing element extends from said hook to said locking nub and generally follows the contour of the side wall for a substantial part of its height to support said side wall.

4. The combination of claim 3 wherein the upper portion of said side wall is more drastically outwardly veering than the rest thereof, said hook having legs extending at generally the same angular inclination as said uppermost portion, the leg following the outside of said upper portion being spaced therefrom to provide for pivoting of the hook of the handle about said rim.

5. The combination of claim 2 wherein said cup is formed of resilient thermoplastic resin allowing the undercut portion of said notch to flex when engaged by the projection of said locking nub.

6. The combination of claim 5 wherein said handle is formed from a substantially rigid thermoplastic resin.

7. The combination of claim 2 wherein a U-shaped leg joins said bottom wall and side wall together, a foot portion of said leg being slanted upwardly from its outside to inside edge, said slanted foot of one such cup adapted to rest on a peripheral edge of said bottom wall of a next lower cup where two such cups are nested together.

8. The combination of claim 4 wherein the leg following the inside of said upper portion has a nib fitting within a slight recess in said upper portion.

References Cited
UNITED STATES PATENTS

| | | | |
|---|---|---|---|
| 2,128,466 | 8/1938 | Machotka | 229—52 |
| 2,834,533 | 5/1954 | Carew | 229—52 |
| 2,982,440 | 5/1961 | Harrison | 229—1.5 |
| 3,144,971 | 8/1964 | Wommelsdorf | 229—1.5 |

DAVID M. BOCKENEK, Primary Examiner

U.S. Cl. X.R.

220—94; 229—1.5